US008656401B2

(12) United States Patent
Venkataramanan et al.

(10) Patent No.: US 8,656,401 B2
(45) Date of Patent: Feb. 18, 2014

(54) METHOD AND APPARATUS FOR PRIORITIZING PROCESSOR SCHEDULER QUEUE OPERATIONS

(75) Inventors: Ganesh Venkataramanan, Sunnyvale, CA (US); Srikanth Arekapudi, Sunnyvale, CA (US); James Vinh, San Jose, CA (US); Mike Butler, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 175 days.

(21) Appl. No.: 13/107,420

(22) Filed: May 13, 2011

(65) Prior Publication Data

US 2012/0291037 A1   Nov. 15, 2012

(51) Int. Cl.
*G06F 9/46*   (2006.01)

(52) U.S. Cl.
USPC .......................................................... 718/103

(58) Field of Classification Search
USPC .......................................................... 718/103
See application file for complete search history.

(56) References Cited

U.S. PATENT DOCUMENTS

2008/0320478 A1*   12/2008   Singh et al. .................. 718/102

* cited by examiner

*Primary Examiner* — Emerson Puente
*Assistant Examiner* — Steven Do
(74) *Attorney, Agent, or Firm* — Volpe and Koenig, P.C.

(57) ABSTRACT

A method and processor are described for implementing programmable priority encoding to track relative age order of operations in a scheduler queue. The processor may comprise a scheduler queue configured to maintain an ancestry table including a plurality of consecutively numbered row entries and a plurality of consecutively numbered columns. Each row entry includes one bit in each of the columns. Pickers are configured to pick an operation that is ready for execution based on the age of the operation as designated by the ancestry table. The column number of each bit having a select logic value indicates an operation that is older than the operation associated with the number of the row entry that the bit resides in.

22 Claims, 8 Drawing Sheets

| Allocation Order | Entry # | 0 | 1 | 2 | 3 | 4 | 5 |
|---|---|---|---|---|---|---|---|
| 6 | 0 | 0 | 1 | 1 | 1 | 1 | 1 |
| 2 | 1 | 0 | 0 | 1 | 0 | 0 | 0 |
| 1 | 2 | 0 | 0 | 0 | 0 | 0 | 0 |
| 4 | 3 | 0 | 1 | 1 | 0 | 0 | 1 |
| 5 | 4 | 0 | 1 | 1 | 1 | 0 | 1 |
| 3 | 5 | 0 | 1 | 1 | 0 | 0 | 0 |

FIG. 6

| Allocation Order | Request | Entry # | 0 | 1 | 2 | 3 | 4 | 5 | Result |
|---|---|---|---|---|---|---|---|---|---|
| 6 | 1 | 0 | 0 | 1 | 1 | 1 | 1 | 1 | 0 |
| 2 | 1 | 1 | 0 | 0 | 1 | 0 | 0 | 0 | 1 |
| 1 | 0 | 2 | 0 | 0 | 0 | 0 | 0 | 0 | 0 |
| 4 | 1 | 3 | 0 | 1 | 1 | 0 | 0 | 1 | 0 |
| 5 | 0 | 4 | 0 | 1 | 1 | 1 | 0 | 1 | 0 |
| 3 | 1 | 5 | 0 | 1 | 1 | 0 | 0 | 0 | 0 |

FIG. 7

| Allocation Order | Request | Entry # | 0 | 1 | 2 | 3 | 4 | 5 | Result |
|---|---|---|---|---|---|---|---|---|---|
| 6 | 1 | 0 | 0 | 1 | 0 | 1 | 1 | 1 | 0 |
| 2 | 1 | 1 | 0 | 0 | 0 | 0 | 0 | 0 | 1 |
| 1 | 0 | 2 | 0 | 0 | 0 | 0 | 0 | 0 | 0 |
| 4 | 1 | 3 | 0 | 1 | 0 | 0 | 0 | 1 | 0 |
| 5 | 0 | 4 | 0 | 1 | 0 | 1 | 0 | 1 | 0 |
| 3 | 1 | 5 | 0 | 1 | 0 | 0 | 0 | 0 | 0 |

Cleared dependencies on deallocation

METHOD AND APPARATUS FOR PRIORITIZING PROCESSOR SCHEDULER QUEUE OPERATIONS

FIELD OF INVENTION

This application is related to scheduler queue operations in a processor.

BACKGROUND

Dedicated pipeline queues have been used in multi-pipeline execution units of processors in order to achieve faster processing speeds. In particular, dedicated queues have been used for execution (EX) units having multiple EX pipelines that are configured to execute different subsets of a set of supported micro-instructions. Dedicated queuing has generated various bottlenecking problems and problems for the scheduling of microinstructions that required both numeric manipulation and retrieval/storage of data.

Additionally, processors are conventionally designed to process operations (Ops) that are typically identified by operation codes (OpCodes), (i.e., instruction codes). In the design of new processors, it is important to be able to process all of a standard set of Ops so that existing computer programs based on the standardized codes will operate without the need for translating Ops into an entirely new code base. Processor designs may further incorporate the ability to process new Ops, but backwards compatibility to older instruction sets is often desirable.

Execution of micro-instructions/Ops is typically performed in an execution unit of a processor. To increase speed, multi-core processors have been developed. Furthermore, to facilitate faster execution throughput, "pipeline" execution of Ops within an execution unit of a processor core is used. Cores having multiple execution units for multi-thread processing are also being developed. However, there is a continuing demand for faster throughput for processors.

One type of standardized set of Ops is the instruction set compatible with "x86" chips, (e.g., 8086, 286, 386, and the like), that have enjoyed widespread use in many personal computers. The micro-instruction sets, such as the "x86" instruction set, include Ops requiring numeric manipulation, Ops requiring retrieval and/or storage of data, and Ops that require both numeric manipulation and retrieval/storage of data. To execute such Ops, execution units within processors have included two types of pipelines: arithmetic logic pipelines ("EX pipelines") to execute numeric manipulations and address generation (AG) pipelines ("AG pipelines") to facilitate load and store Ops.

In order to quickly and efficiently process Ops as required by a particular computer program, the program commands are decoded into Ops within the supported set of microinstructions and dispatched to the execution unit for processing. Conventionally, an OpCode is dispatched that specifies the Op/micro-instruction to be performed along with associated information that may include items such as an address of data to be used for the Op and operand designations.

Dispatched instructions/Ops are conventionally queued for a multi-pipeline scheduler of an execution unit. Queuing is conventionally performed with some type of decoding of a micro-instruction's OpCode in order for the scheduler to appropriately direct the instructions for execution by the pipelines with which it is associated within the execution unit.

Figure 1:
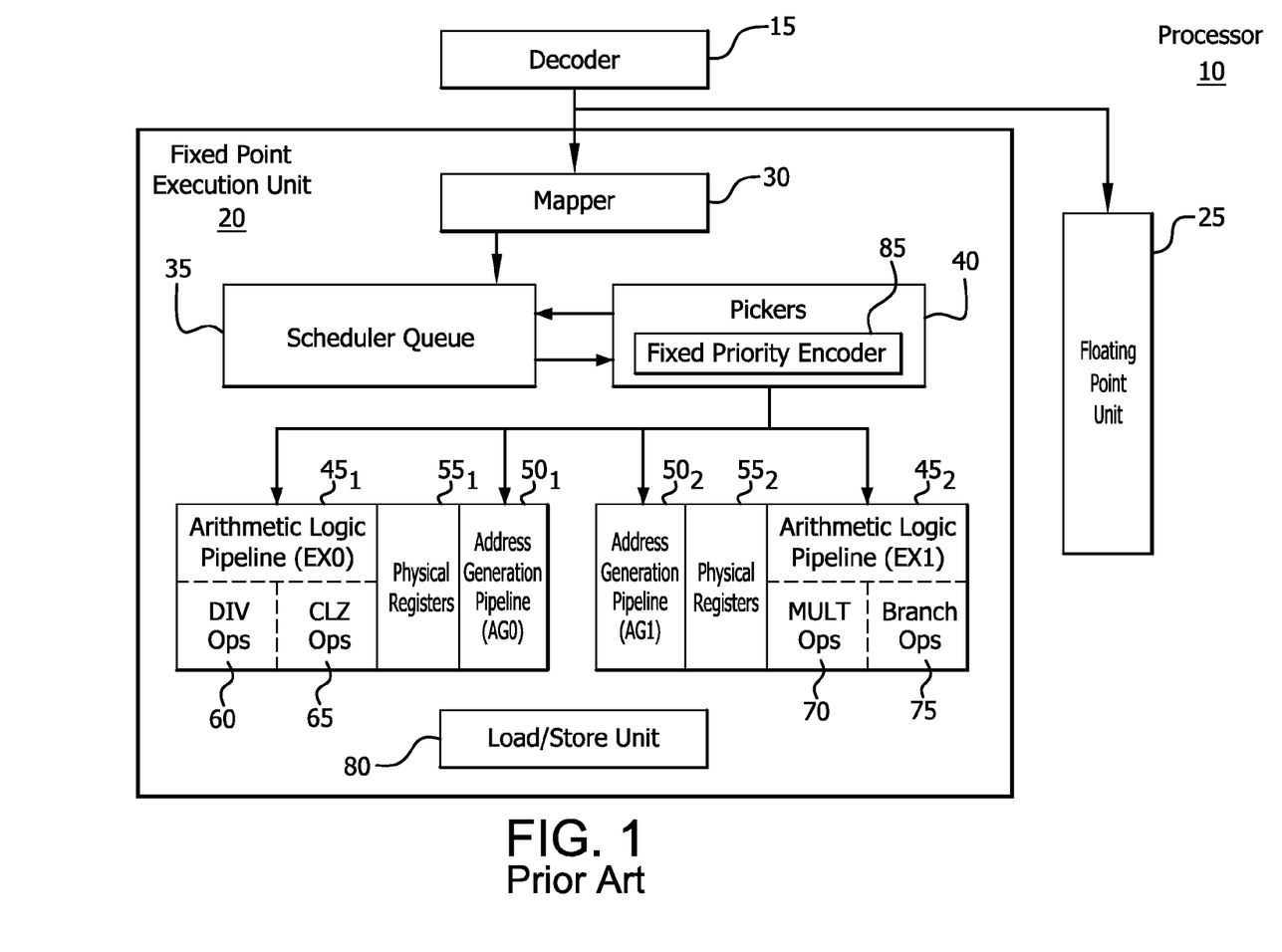
FIG. 1 shows an example of a block diagram of a conventional processor of a multi-processor IC.

FIG. 1 shows an example of a block diagram of a conventional processor 10, which may be one of many processors residing in an integrated circuit (IC). The processor 10 includes a decoder 15 that decodes and dispatches micro-instructions to a fixed point execution unit 20. Multiple fixed point execution units may be provided for multi-thread Op. Optionally, a second fixed point execution unit (not shown) may be provided for dual thread processing.

The conventional processor 10 further includes a floating point unit 25 for execution of floating point instructions. Preferably, the decoder 15 dispatches instructions in information packets over a common bus to both the fixed point execution unit 20 and the floating point unit 25.

The fixed point execution unit 20 includes a mapper 30 associated with a scheduler queue 35 and pickers 40. These components control the selective distribution of Ops among a plurality of arithmetic logic (EX) pipelines 45 and address generation (AG) pipelines 50. The pipelines 45 and 50 execute Ops queued in the scheduler queue 35 by the mapper 30 that are picked therefrom by the pickers 40 and directed to an appropriate pipeline 45 or 50. In executing a micro-instruction, the pipelines 45 and 50 identify the specific kind of Op to be performed by a respective OpCode assigned to that kind of micro-instruction.

In the example shown in FIG. 1, the fixed point execution unit 20 includes four pipelines for executing queued Ops. A first arithmetic logic pipeline $45_1$ (EX0) and a first address generation pipeline $50_1$ (AG0) are associated with a first set $55_1$ of physical registers in which data is stored relating to execution of specific Ops by the two pipelines $45_1$ and $50_1$. A second arithmetic logic pipeline $45_2$ (EX1) and a second address generation pipeline $50_2$ (AG1) are associated with a second set $55_2$ of physical registers in which data is stored relating to execution of specific Ops by those two pipelines $45_2$ and $50_2$. Preferably, there are 96 physical registers in each of the first and second sets of registers $55_1$ and $55_2$.

In the example fixed point execution unit 20 shown in FIG. 1, the arithmetic logic pipelines 45 (EX0, EX1) have asymmetric configurations. The first arithmetic pipeline $45_1$ (EX0) is preferably the only pipeline configured to process divide (DIV) Ops 60 and count leading zero (CLZ) Ops 65 within the fixed point execution unit 20. The second arithmetic pipeline $45_2$ (EX1) is preferably the only pipeline configured to process multiplication (MULT) Ops 70 and branch Ops 75 within the fixed point execution unit 20.

DIV and MUL Ops generally require multiple clock cycles to execute. The complexity of both arithmetic pipelines is reduced by not requiring either arithmetic pipelines to perform all possible arithmetic Ops, and by dedicating multi-cycle arithmetic Ops for execution by only one of the two arithmetic pipelines. This saves chip real estate while still permitting a substantial overlap in the sets of Ops that can be executed by the respective arithmetic pipelines EX0, EX1.

The processing speed of the fixed point execution unit 20 may be affected by the operation of any of the components. Since all the micro-instructions that are processed must be mapped by the mapper 30 into the scheduler queue 35, any delay in the mapping/queuing process can adversely affect the overall speed of the fixed point execution unit 20.

There are three kinds of Ops requiring retrieval and/or storage of data; namely, load (LD), store (ST) and load/store (LD-ST). These Ops are performed by the address generation pipelines 50 (AG0, AG1) in connection with a load/store unit 80 of the fixed point execution unit 20.

The pickers 40 of the conventional processor 10 may include at least one fixed priority encoder 85. Typical priority encoders, which are used for age order picks in any scheduler-like logic, depend on the occurrence of an allocation in a fixed order (top-to-bottom or bottom-to-top). A fixed priority encoder works on a set of requesters, which are the Ops having all sources available and ready to be picked. The fixed priority encoder also works on age arbitrates, which indicate the relative age information for all of the Ops in the queue. Based on the foregoing, the fixed priority encoder identifies at least one requester that is granted the request for an entry to be picked.

Figure 2A:
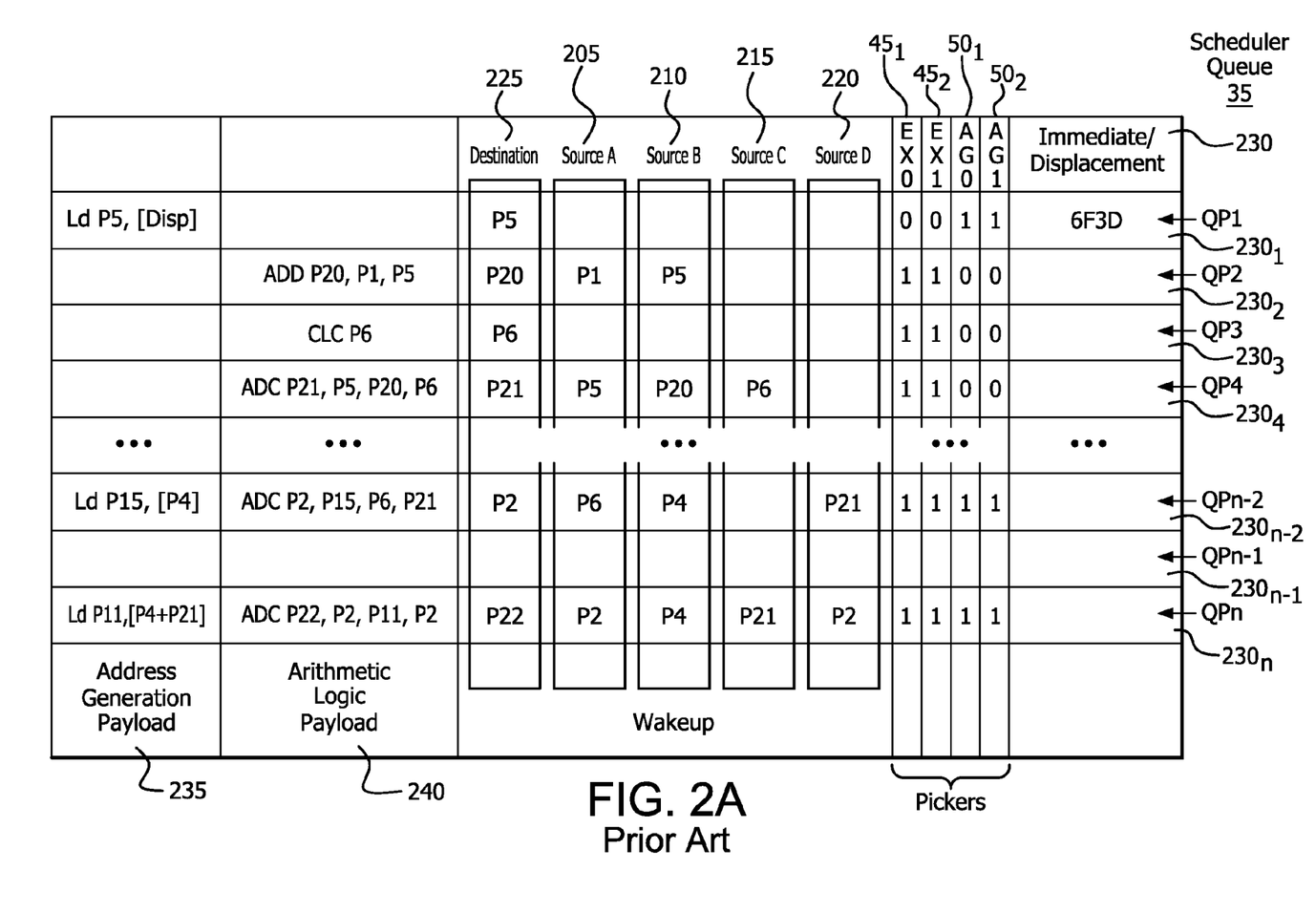
FIG. 2A shows a plurality of queue positions in a scheduler queue residing in the conventional processor.

FIG. 2A shows a plurality of queue positions QP1 ... QPn in the scheduler queue 35. The scheduler queue 35 preferably has 40 positions. Generally, it is preferable to have at least five times as many queue positions as there are pipelines to prevent bottlenecking of the unified scheduler queue 35. However, when a unified queue that services multiple pipelines has too many queue positions, scanning Ops may become time prohibitive and impair the speed in which the scheduler operates. The scheduler queue 35 is sized such that queued instructions for each of the four pipelines can be picked and directed to the respective pipeline for execution in a single cycle. The full affect of the speed of the scheduler queue 35 directing the execution of queued instructions can be realized because there is no impediment in having instructions queued into the scheduler queue due to the mapper's speed in queuing instructions based on OpTypes, which may signify whether an instruction is an EX operation or an AG operation.

Referring again to FIG. 1, the mapper 30 is configured to queue a micro-instruction into an open queue position based on the micro-instruction's information packet received from the decoder 15. Preferably, the mapper 30 is configured to receive two instruction information packets in parallel, which the mapper 30 preferably queues in a single clock cycle. The decoder 15 is preferably configured to dispatch four instruction information packets in parallel. Two of the packets are preferably flagged for potential execution by the fixed point execution unit 20 and the other two flagged for potential execution by the second similar fixed point execution unit 20.

Preferably, the floating point unit 25 scans the OpType of all four packets dispatched in a given clock cycle. Any floating point instruction components indicated by the scan of the OpType fields data of the four packets are then queued and executed in the floating point unit 25.

The mapper 30 is preferably configured to make a top to bottom scan and a bottom to top scan in parallel of the queue positions QP1-QPn to identify a topmost open queue position and bottom most open queue position; one for each of the two micro-instructions corresponding to two packets received in a given clock cycle.

Where the OpType field data of a dispatched packet indicates OpType FP, the micro-instruction corresponding to that packet is not queued because it only requires execution by the floating point unit 25. Accordingly, even when two instruction information packets are received from the decoder 15 in one clock cycle, one or both microinstructions may not be queued in the scheduler queue 35 for this reason.

One of the primary goals for the scheduler queue 35 is to try to pick operations from a pool of Ops in their age order. Once a plurality of Ops are stored in the scheduler queue 35, it is desirable to pick those entries that are ready to be executed in the order in which they arrived in the scheduler queue 35 to provide the best possible scheduling of the Ops. However, in order to do that traditionally, the entries in the queue are always maintained in age order. Thus, the top entry is the oldest, and the bottom entry is the newest, and a significant amount of logic and power is required to maintain the scheduler queue 35 in this manner.

As shown in FIG. 2A, each queue position QP1 ... QPn is associated with memory fields for an arithmetic logic instruction (ALU payload) 45, an address generation instruction (AG payload) 50, four wakeup content-addressable memories (CAMs) 205, 210, 215 and 220 (sources A-D) that identify addresses of physical registers that contain source data for the instruction, and a destination CAM 225 (destination) that identifies a physical register where the data resulting from the execution of the micro-instruction is to be stored.

A separate data field 230 (immediate/displacement) is provided for accompanying data that an instruction is to use. Such data is sent by the decoder 15 in the dispatched packet for that instruction. For example, a load operation Ld is indicated in queue position QP1 that seeks to have the data stored at the address 6F3D indicated in the immediate/displacement data field into the physical register identified as P5. In this case, the address 6F3D was data contained in the instruction's information packet dispatched from the decoder 15, which information was transferred to the immediate/displacement data field $230_1$ for queue position QP1 in connection with queuing that instruction to queue position QP1.

The ALU payload fields 235 and the AG payload fields 240 are configured to contain the specific identity of an instruction as indicated by the instruction's OpCode, along with relative address indications of the instruction's required sources and destinations that are derived from the corresponding dispatched data packet. In connection with queuing, the mapper 30 translates relative source and destination addresses received in the instruction's information packet into addresses of physical registers associated with the pipelines 45 and 50 of FIG. 1.

The mapper 30 tracks relative source and destination address data received in the instruction information packets so that it can assign the same physical register address to a respective source or destination where two instructions reference the same relative address. For example, P5 is indicated as one of the source operands in the ADD instruction queued in queue position QP2, and P5 is also identified as the destination address of the result of the Ld operation queued in queue position QP1. This indicates that the dispatched packet for the Ld instruction indicated the same relative address for the destination of the Ld operation as the dispatched packet for the ADD instruction had indicated for one of the ADD source operands.

Referring to FIGS. 1 and 2A, flags are provided in the scheduler queue 35 to indicate eligibility for picking the instruction for execution in the respective pipelines 45 and 50 (EX0, EX1, AG0, and AG1). The pickers 40 preferably include an individual picker for each of the ALU pipelines 45 (EX0, EX1) and the AG pipelines 50 (AG0, AG1). Each respective pipeline's picker scans the respective pipeline picker flags of the queue positions to find queued operations that are eligible for picking. Upon finding an eligible queued operation, the picker checks to see if the instruction is ready to be picked. If it is not ready, the picker resumes its scan for an eligible instruction that is ready to be picked. Preferably, the EX0 and AG0 pickers scan the flags from the top queue position QP1 to the bottom queue position QPn, and the EX1 and AG1 pickers scan the flags from the bottom queue position QPn to the top queue position QP1 during each cycle. A picker will stop its scan when it finds an eligible instruction that is ready for execution, and then direct that instruction to its respective pipeline. Preferably this occurs in a single clock cycle.

Readiness for picking is indicated by the source wakeup CAMs 205, 210, 215 and 220 for the particular operation component being awake indicating a ready state. Where there is no wake up CAM being utilized for a particular instruction component, the instruction is automatically ready for picking. For example, the Ld operation queued in queue position QP1 does not utilize any source CAMs so that it is automatically ready for picking by either of the AG0 or AG1 pickers upon queuing. In contrast, the ADD instruction queued in queue position QP2 uses the queue position's wakeup CAMs sources A and B. Accordingly, that ADD instruction is not ready to be picked until the physical registers P1 and P5 have been indicated as ready by queue position QP2's wakeup CAMs source A and source B being awake.

Where one of the arithmetic pipelines is performing a multi-cycle operation, the pipeline preferably provides its associated picker with an instruction to suspend picking operations until the arithmetic pipeline completes execution of that multi-cycle operation. In contrast, the address generation pipelines are preferably configured to commence execution of a new address generation instruction without awaiting the retrieval of load data for a prior instruction. Accordingly, the pickers will generally attempt to pick an address generation instruction for each of the address generation pipelines AG0, AG1 for each clock cycle when there are available address generation instructions that are indicated as ready to pick.

In some cases, the CAMs may awake before the required data is actually stored in the designated physical register. Typically, when a load instruction is executed where a particular physical register is indicated as the load destination, that physical register address is broadcast after four cycles to the wakeup CAMs in order to wake up all of the CAMs designated with the physical register's address. Four cycles is a preferred nominal time it takes to complete a load operation. However, it can take much longer if the data is to be retrieved by the load/store unit 80 from a remote location. Where an instruction is picked before the physical register actually contains the required data, the execution unit is preferably configured to replay the affected instructions which are retained in their queue positions until successful completion.

Figure 2B:
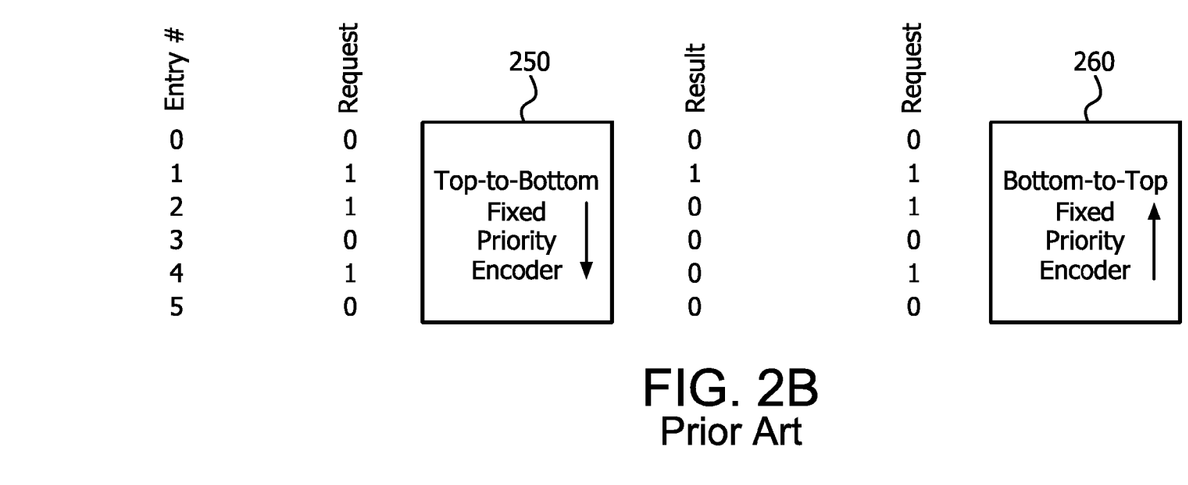
FIG. 2B shows an example of a request and the result of conventional priority encoding in a six-entry scheduler queue.

FIG. 2B shows an example of conventional priority encoding in a six-entry scheduler queue having entry numbers 0-5 with corresponding requests, (i.e., operations ready to be picked), and results (i.e., the output of a priority encoder), for both a top-to-bottom fixed priority encoder 250 and a bottom-to-top fixed priority encoder 260 located in the scheduler queue 35. The priority encoder 250 generates a "one-hot vector," (a vector having no more that one bit having a logic one value), based on a "multi-hot vector," (a vector that may have more than one bit having a logic one value). Thus, the top entry number is 0, (i.e., the oldest entry), the bottom entry number is 5, (i.e., the youngest entry), and the entry numbers 1, 2 and 4 are occupied, (i.e., the six-entry queue currently has an occupancy of 3 entries). In accordance with the example shown in FIG. 2B, the first entry from the top (entry 1)) that requests to be picked is granted a result when a top-to-bottom fixed priority encoder 250 is used, and the first entry from the bottom (entry 4) that requests to be picked is granted a result when a bottom-to-top fixed priority encoder 260 is used. Multiple pickers are implemented as more than one operation is issued in each cycle. The priority encoders for different pickers may be configured to scan in different directions.

In order to perform an age pick through the typical priority encoder logic, extra hardware is required in order to always re-arrange the scheduler queue 35 such that holes, which result when entries are picked, issued and executed, are either at the top or bottom of the queue, (based on the priority encoder's scan direction). Such holes result when an entry is picked and issued. The entry that is picked is then cleared so that it will not be picked again in the next cycle.

Figure 2C:
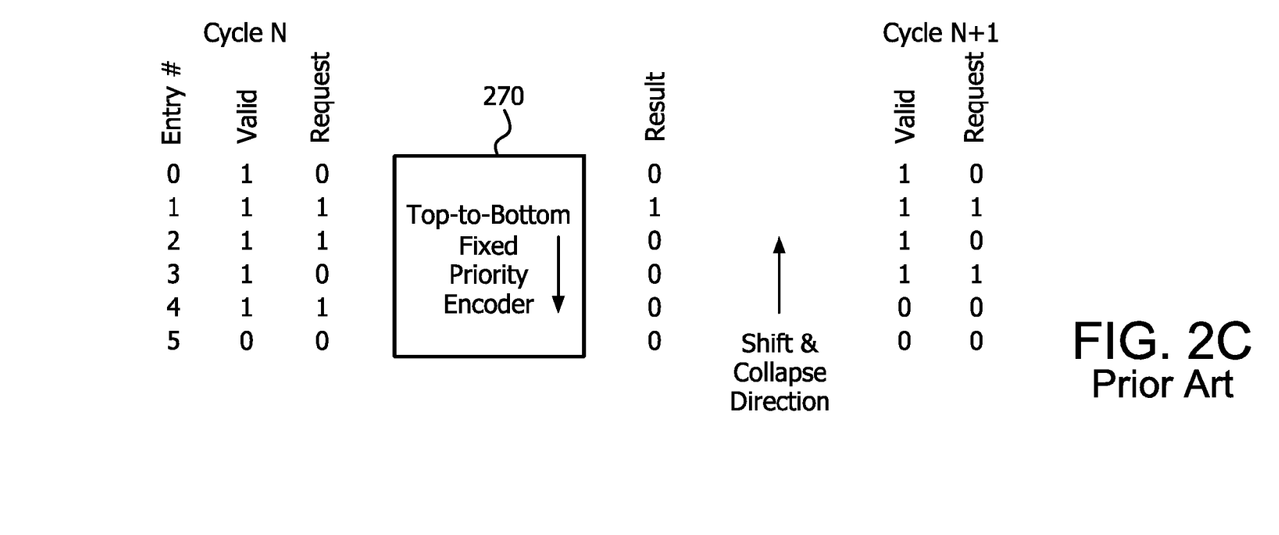
FIG. 2C shows an example of a conventional top-to-bottom age scheduler queue.

FIG. 2C shows an example of a top-to-bottom age scheduler queue having entry numbers 0-5 with corresponding pick requests and results for a top-to-bottom fixed priority encoder 270 located in the scheduler queue 35. As shown in the example of FIG. 2C, there are five valid entries in cycle N, and entry numbers 1, 2 and 4 are requesting to be picked. As indicated in the result column of FIG. 2C, only entry 1 will be granted its request (i.e., receive a result of 1) to be picked, issued and executed. However, in cycle N+1, it is necessary for the scheduler queue 35 to be age ordered again, whereby the hole, which is created when entry number 1 is picked, issued and executed, has to be "collapsed" by shifting entry numbers 2, 3 and 4 to entry numbers 1, 2 and 3.

This shifting and collapsing process becomes even more complicated when the picker can pick more than one entry per cycle. For example, if entry numbers 1 and 3 shown in FIG. 2C are picked, then there is a variable shift amount for each entry (i.e., entry number 2 will shift by 1 entry, but entry numbers 4 and 5 will shift by 2 entries). This shifting and collapsing process is complicated and slows down the cycle time for other logic, and it causes a significant power drain as well. For example, consider a scenario where more than 400 bits are shifted each time an Op (entry) is picked.

It would be desirable to eliminate the shifting collapsing nature of the scheduler queue. By doing so, the efficiency of the processor would be greatly enhanced.

SUMMARY OF EMBODIMENTS

A method and processor are described for implementing programmable priority encoding to track relative age order of operations in a scheduler queue. In one embodiment, the processor may comprise a scheduler queue configured to maintain an ancestry table including a plurality of consecutively numbered row entries and a plurality of consecutively numbered columns. Each row entry includes one bit in each of the columns. Pickers are configured to pick an operation that is ready for execution based on the age of the operation as designated by the ancestry table. The column number of each bit having a select logic value indicates an operation that is older than the operation associated with the number of the row entry that the bit resides in.

An allocation order number may be designated for each row entry. A plurality of requests may be received that correspond to respective ones of the row entries. A plurality of results may be determined that indicate the priority of the row entries, depending on whether the row entries are read from top-to-bottom or bottom-to-top.

A plurality of new operations may be received, a queue identifier (QID) may be assigned to each new operation, and a QID list may be established that indicates, for each row entry, whether or not the operation associated with the row entry is requesting to be picked. The list may assign unused QIDs to newly received operations so that every operation in the scheduler queue has a unique identifier. A set of bits may be stored in an unassigned row entry of the ancestry table. The bit set may indicate the row entries associated with the new operations. A post wake unit may check the operations in queue to determine whether they are ready to be picked and executed.

In another embodiment, a scheduler queue maintains an ancestry table. The ancestry table includes a plurality of consecutively numbered queue identifier (QID) row entries and a plurality of consecutively numbered columns. Each QID row entry includes one bit in each of the columns. A plurality of new operations are received and a first set of bits is stored in an unassigned QID row entry of the ancestry table. The first bit set indicates the QID row entries associated with the new operations. At least one additional set of bits in at least one other unassigned QID row entry of the ancestry table may indicate the priority of each of the new operations. Each bit in the first bit set having a select logic value may indicate a particular QID row entry associated with a new operation.

A computer-readable storage medium storing a set of instructions for execution by one or more processors to facilitate manufacture of the processor described above. The instructions may be Verilog data instructions or hardware description language (HDL) instructions.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

In accordance with the present invention, a scheduler queue uses a programmable priority encoder as an age relation arbitrator. The shifting collapsing nature of the scheduler queue may be eliminated if an age relationship and arbitrate is maintained amongst the requesting entries in accordance with the present invention.

Figure 3A:
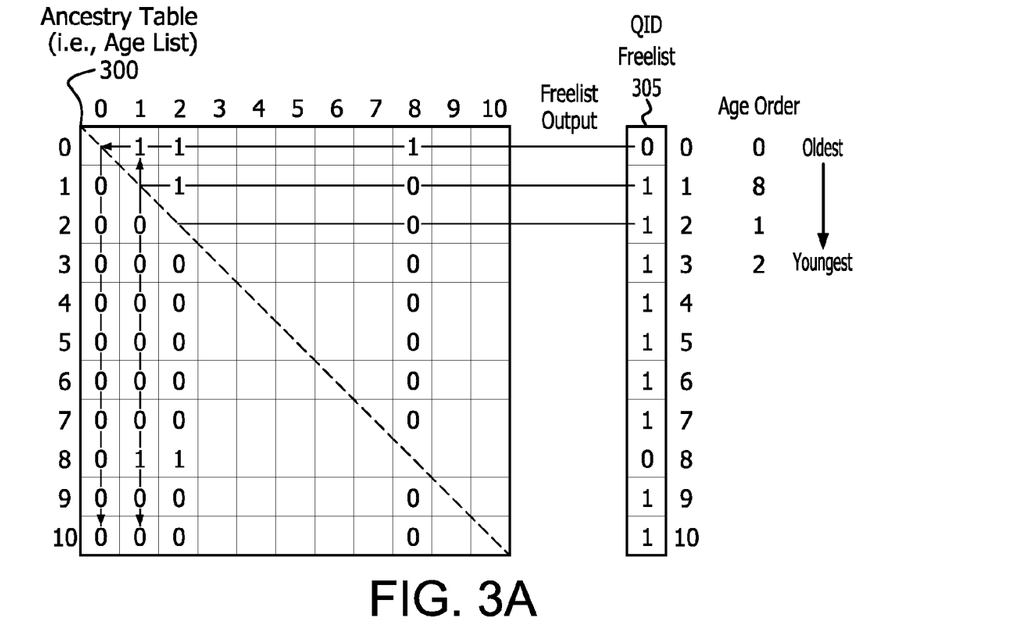
FIG. 3A shows an example of an ancestry table and a queue identifier (QID) freelist configured in accordance with the present invention.

FIG. 3A shows an example of an ancestry table (i.e., age list) 300 that is responsible for tracking the age of operations (Ops), (i.e., oldest to youngest), in a scheduler queue every cycle. This ancestry table 300 tracks precedence at allocation time by storing the age relationships between Ops in a precedence matrix of queue identifiers (QIDs). The age order is shown on the right side of FIG. 3A, next to a QID freelist 305 having a valid bit structure that indicates the free entries (e.g., 0 and 8).

In the ancestry table 300 of FIG. 3A, there are 11 rows 0-10 and 11 columns 0-10. The occurrence of a logic one (1) entry bit having a particular row and column number indicates that there is an established age relationship, whereby an entry corresponding to the row is older than the entry corresponding to the column. For example, in row 0 of the ancestry table shown in FIG. 3A, there is a logic one (1) entry bit in columns 1, 2 and 8, which indicates that entry number 0 is older than entry numbers 1, 2 and 8. Thus, entry 0 is the oldest entry. In row 1, there is a logic one (1) entry bit in column 2, which indicates that entry 1 is older than entry 2. Finally, in row 8, there is a logic one (1) entry bit in column 1, which indicates that entry 8 is older than entry 1. Thus, an age relationship among Ops 0, 1, 2 and 8 is established, whereby the age order from oldest to youngest is entry 0, entry 8, entry 1 and finally entry 2.

As shown in FIG. 3A, the state of the QID freelist 305 is shown after Ops 0 and 8 are allocated, whereby entries 1-7, 9 and 10 are requesting to be picked, as indicated by the logic one (1) entry bits, and the entries 0 and 8 are free, (not requesting to be picked), as indicated by the logic zero (0) entry bits.

Figure 3B:
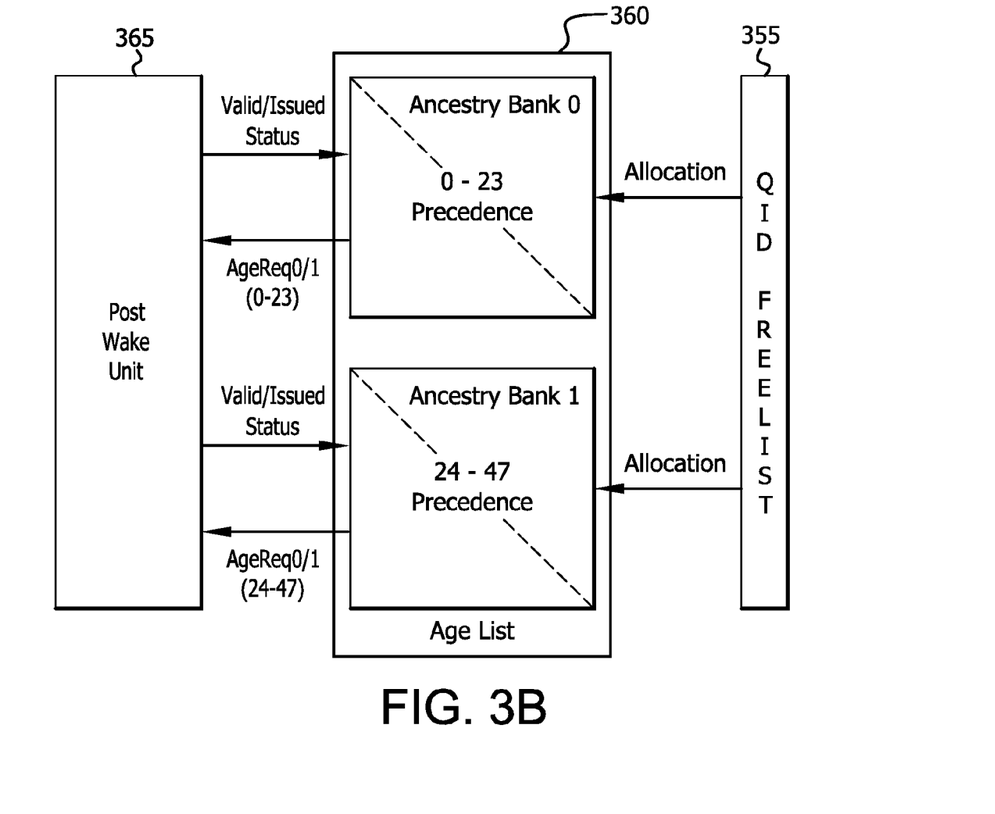
FIG. 3B shows an age list scheme using two precedence matrices, a QID freelist and a post wake unit in accordance with the present invention.

FIG. 3B shows a QID freelist 355, a precedence age list 360 and a post wake unit 365. The precedence age list 360 includes two ancestry banks (0 and 1) having 24×24 entries are provided, one for the oldest Op (ancestry bank 0) and the other preferably for the second oldest Op (ancestry bank 1). The QID freelist 355 keeps track of the unused QIDs in a scheduler. The QID freelist 355 assigns free QIDs to newly received operations so that every operation in the scheduler has a unique identifier. The post wake unit 365 checks the operations in the queue to see whether they are ready to be picked, and incorporates age information received from the age list 360, which provides a one-hot vector for every pipeline. The entry in the one-hot vector is selected as being the oldest entry.

In accordance with the present invention, no shifting and collapsing is necessary to keep track of the age order of the entries of a scheduler queue. The present invention enables the storing and arbitrating of entry age relationships through an ancestry table, which stores the relation between an entry and all other entries at the time the entry was allocated. This avoids the problem posed by a conventional scheduler queue where the entire scheduler queue information of more than 400 bits has to be shifted and collapsed, which drains a significant amount of power. While the conventional scheduler queue serves as a fixed priority encoder that is scanned from top to bottom to determine the age of each entry, the present invention enables entry priority to be arbitrarily allocated through programmable priority.

Figure 4:
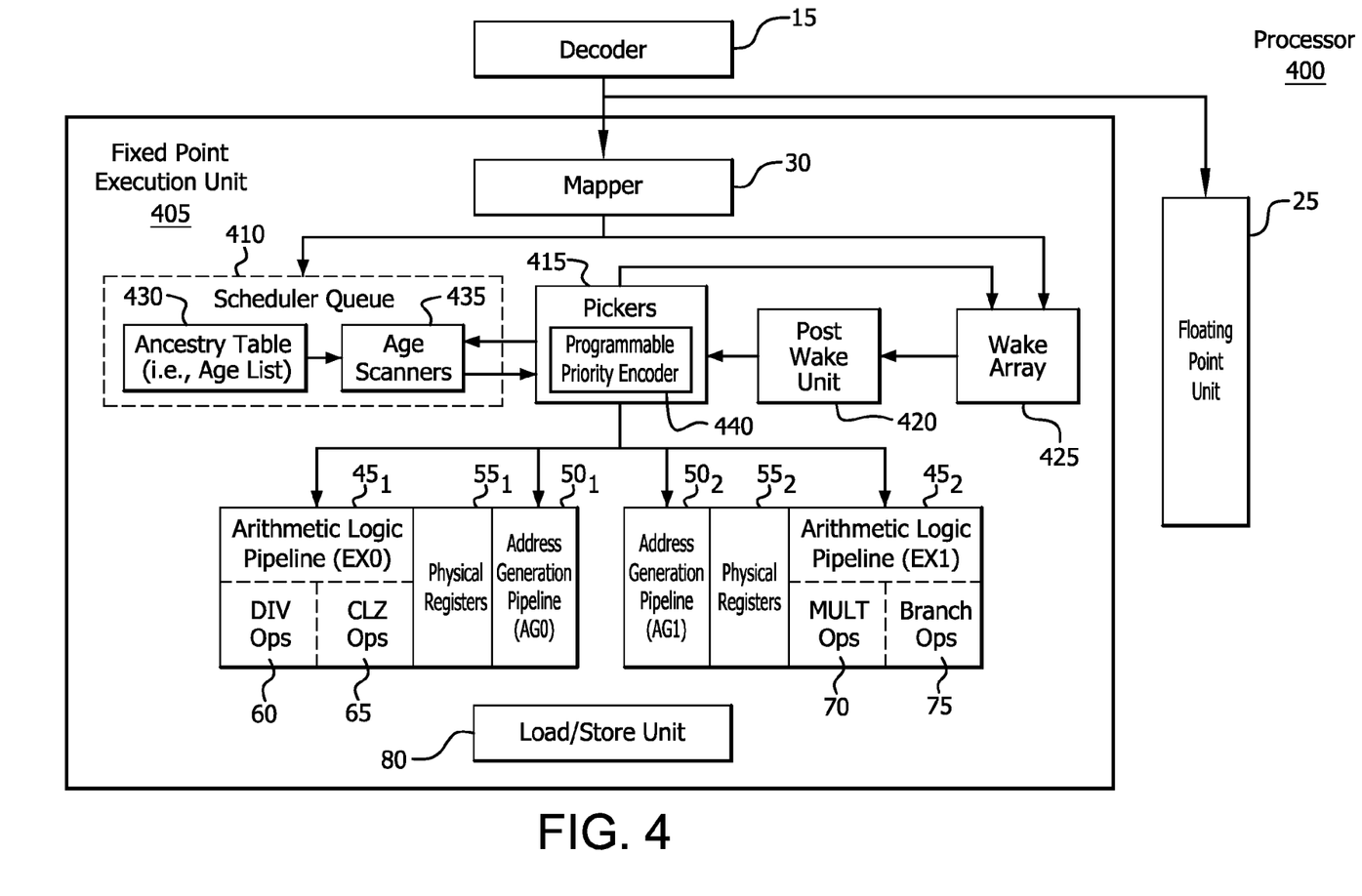
FIG. 4 shows an example of a block diagram of a processor having a scheduler queue that is configured in accordance with the present invention.

FIG. 4 shows an example of a block diagram of a processor 400 that is configured in accordance with the present invention. The processor 400 includes a fixed point execution unit 405, which includes a scheduler queue 410, pickers 415, a post wake unit 420 and a wake array 425. The scheduler queue 410 includes an ancestry table, (i.e., age list), 430 and age scanners 435. The pickers 415 include at least one programmable priority encoder 440. If the oldest operation is not eligible to be picked, then the output of the programmable priority encoder 440 is picked. The wake array 425 keeps track of the dependencies of each operation and wakes them up when they are ready to be picked and executed.

In accordance with the present invention, programmable priority encoding is implemented in the processor 400 in which the ancestry table 430 keeps track of the relative age order of all the operations in the scheduler queue 410. Every cycle, scans are performed to find out the oldest entry: one from a first subset, (e.g., see ancestry bank 0 in age list 360 of FIG. 3B), and the other from a second subset, (e.g., see ancestry bank 1 in age list 360 of FIG. 3B), used for the EX0/1 pipelines. The AG0/1 pipelines receive the oldest entries in a similar fashion. While picking an operation for execution, (either in the EX or AG pipelines), the operations that are oldest in the corresponding vectors from the ancestry table have the highest priorities. If the oldest operations are not ready, the priority is assigned to the first one from the top which is ready (EX1, AG1) or the first one from the bottom (EX0/AG0).

Figure 5:
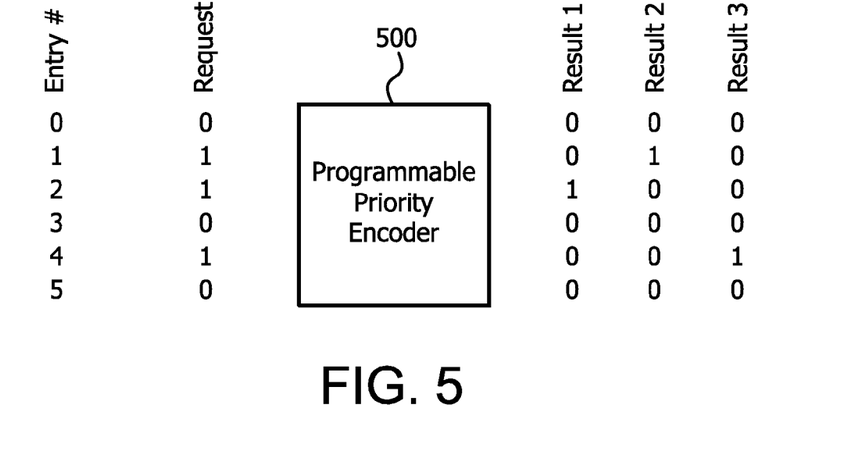
FIG. 5 shows an example of programmable priority encoding in a six-entry scheduler queue.

FIG. 5 shows an example of programmable priority encoding in a six-entry scheduler queue having entry numbers 0-5 with corresponding requests and three results for each request. As shown in FIG. 5, since the request has 3 operations that are ready, (each denoted by 1), any one of these operations may be picked, depending on which one of it is oldest. If the oldest entry from the ancestry table does not match any one of the operations which are ready, then the priority encoder 500 may be used to pick one. The priority encoder 500 may be a top-to-bottom encoder or a bottom-to-top encoder. Thus, as shown in FIG. 5, the result may be "result 2" (top-to-bottom) or "result 3" (bottom-to-top).

Figure 6:
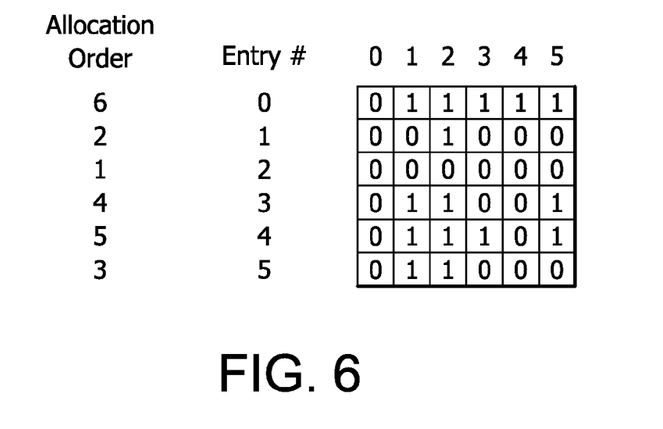
FIG. 6 shows an example of a 6-entry ancestry table.

FIG. 6 shows an example of a 6-entry ancestry table where the order of allocation is shown on the left. In the 6-entry ancestry table of FIG. 6, there are 6 row entries 0-5 and 6 columns 0-5. Scans are performed to determine the oldest entries in an ancestry table associated with operations.

A plurality of operations are stored in a scheduler queue. An ancestry table is maintained in the scheduler queue. The ancestry table includes a plurality of consecutively numbered row entries and a plurality of consecutively numbered columns, each row entry including one bit in each of the columns. An operation is picked that is ready for execution based on the age of the operation as designated by the ancestry table.

Referring to FIG. 6, the column number of each bit has a logic one value that indicates an operation that is older than the operation associated with the number of the row entry that the bit resides in. For example, for entry number 5, there is a logic one (1) bit in columns 1 and 2, which indicates that row entries 1 and 2 are older than entry 5. Similarly, for row entry 1, there is a logic one (1) bit in column 2, which indicates that row entry 2 is older than row entry 1. The allocation order denotes the priority, (i.e., 1 is the highest priority and 6 is the lowest priority). Since there are 6 row entries, the priority is from 1-6.

Figure 7:
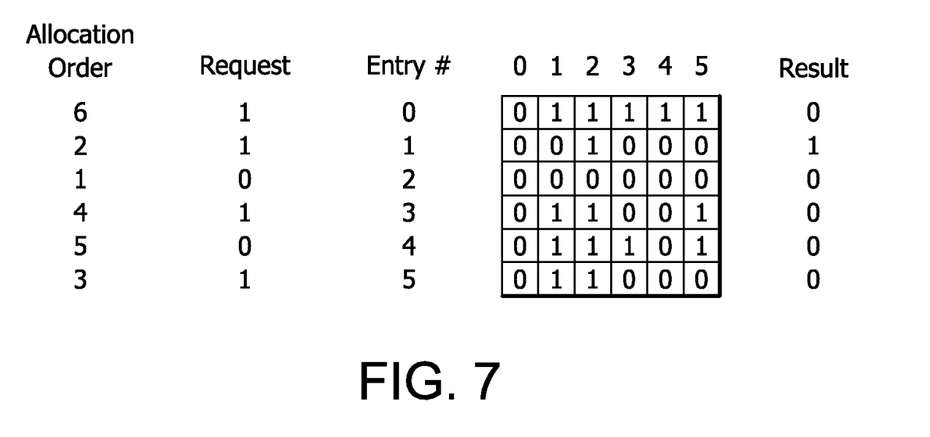
FIG. 7 shows how the arbitration function is implemented in the G-entry ancestry table of FIG. 6.
Figure 8:
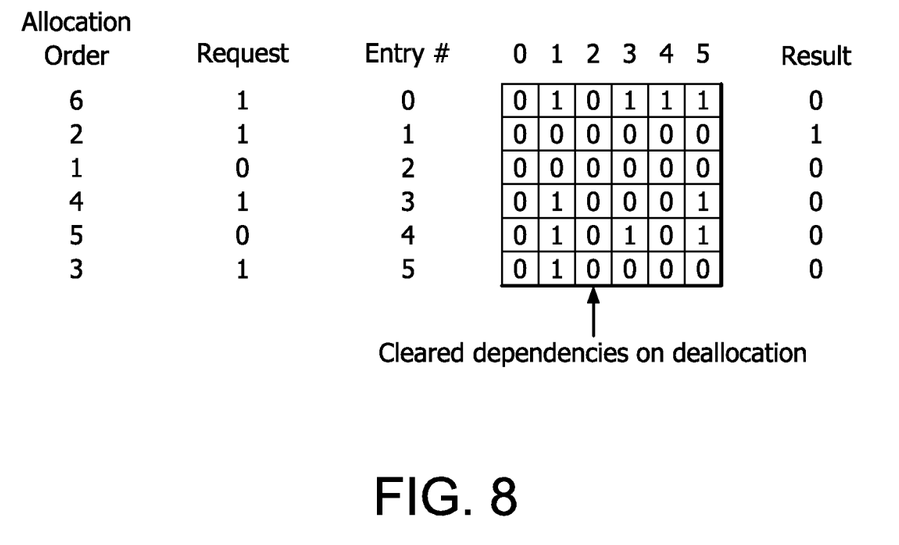
FIG. 8 shows the configuration of the ancestry table of FIG. 7 after the successful servicing and deallocation of an entry in FIG. 7 occurs.

FIG. 7 shows how entry requests are resolved in the 6-entry ancestry table of FIG. 6. Each time an entry requests to be picked, the ancestry table resolves the entry that is the oldest and picks that entry. When an entry has its request serviced successfully and deallocates, then the corresponding column is cleared so that all dependencies on this entry is cleaned up. Once the entry's request is picked and serviced, the scheduler QID token may be freed up so that it may be allocated to the newly received operations. The ancestry table is then cleared, as it only keeps track of operations in flight. Whenever the deallocated QID token is allocated again, the age dependencies are written back into the ancestry table, based on the age order at that instance. As an example, FIG. 8 shows the configuration of the ancestry table of FIG. 7 after the successful servicing and deallocation of entry 2 occurs.

Another embodiment of the present invention enables the number of write ports, (simultaneous writes), of an ancestry table, (i.e., age list). If there is a need for 2 or more simultaneous entries to be written into the ancestry table, the same number of write ports are required. Even when writing ancestry order amongst the 2 QID row entries, a 2-write ancestry table must be configured. By ensuring that the 2 writes occur in a particular priority order, (e.g., top-to-bottom (oldest to youngest)), the write request is OR'd with data to be written to obtain an effective age resolution amongst previously valid and simultaneously allocated Ops. This requires a multi-hot write request in the ancestry table, which would not overlap and would reduce a 2-write ancestry table to a 1-write ancestry table.

Figure 9A:
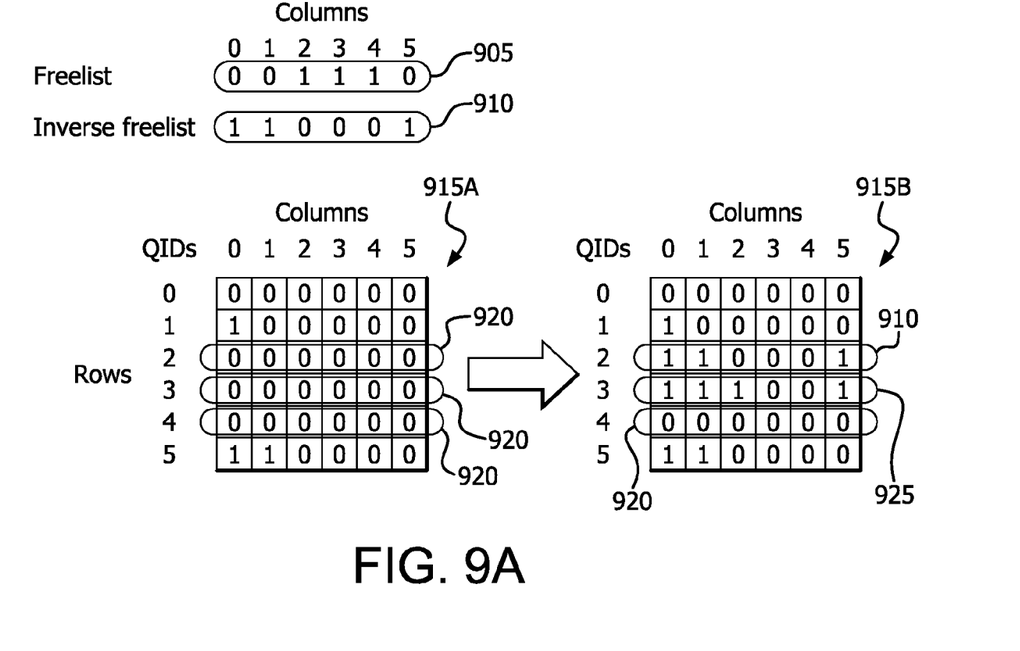
FIG. 9A shows an example of writing two simultaneous entries into a valid bit structure in ancestry order.

FIG. 9A shows a simplified example with 2 simultaneous writes. A QID freelist 905 keeps track of the unassigned (i.e., free) QIDs in the scheduler queue and assigns them to newly received operations, so that every operation in the scheduler has a unique identifier (QID). An inverse freelist 910 is generated to indicate the relative age ordering among the received operations. The order of priority ranges from 0 to 5, (i.e., if QIDs 2 and 3 are free, QID 2 is assigned before QID 3. The lower the number of a free QID, the higher its priority.

As shown in ancestry table 915A of FIG. 9A, a subset (e.g., 2) of a plurality of unassigned QID row entries 920, (i.e., all of the bits are zero), are associated with two new operations that are received in the current cycle and have the QIDs 2 and 3 assigned to them. There is a need to write the new corresponding entries into the ancestry table 915A whenever the QIDs are allocated. However, this does not provide the relative age ordering within the operations allocated at the same time.

Referring back to FIGS. 4 and 9A, the processor 400 is configured to implement programmable priority encoding to track relative age order of scheduler queue operations. The processor 400 comprises a scheduler queue 410 configured to store a plurality of operations. The scheduler queue 410 includes an ancestry table 915B having a plurality of consecutively numbered QID row entries and a plurality of consecutively numbered columns. Each QID row entry includes one bit in each of the columns. When a plurality of new operations are received, a first set of bits 925 is stored in an unassigned QID row entry 920 of the ancestry table 915B. The first bit set 925 indicates the QID row entries associated with the new operations. The pickers 415 are configured to determine the oldest entries in the ancestry table 915B associated with respective operations.

At least one additional set of bits may be stored in at least one other unassigned QID row entry 920 of the ancestry table 915 that indicates the priority of each of the new operations. Each bit in the first bit set 925 having a logic zero value indicates a particular QID row entry associated with a new operation.

Figure 9B:
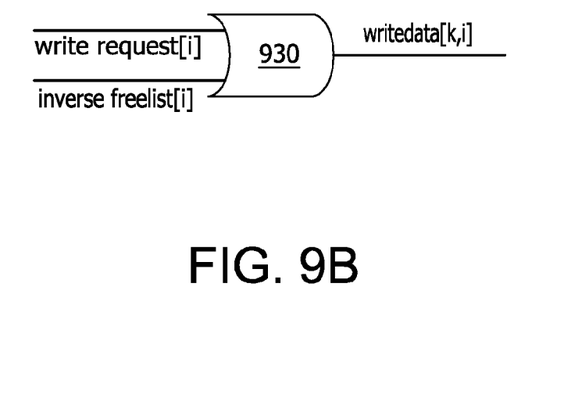
FIG. 9B shows an example of the logic that may be used to provide the relative age ordering within the operations allocated at the same time.

FIG. 9B shows an example of the logic, (represented by an OR gate 930), that may be used to provide the relative age ordering within the operations allocated at the same time in an ancestry table 915. Variables k and i are used to track the row and column being written, as shown in the example of FIG. 9A. For a given row k, the write data at each column i is denoted by writedata[k,i], which is output by the OR gate 930. If k<i, writedata[k,i] is equal to the inverse freelist[i]. If k>i, writedata[k,i] is equal to the write request[i] OR'd with the inverse freelist[i], as shown in FIG. 9B. Since QID 2 has a higher priority than QID 3 in the ancestry table 915B of FIG. 9A, the logic shown in FIG. 9B assists in writing the associated QID row entries into the ancestry table 915B of FIG. 9A.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method, implemented by a processor, of implementing programmable priority encoding to track relative age order of operations in a scheduler queue, the method comprising:
   maintaining, in the scheduler queue, an ancestry table including a plurality of consecutively numbered row entries and a plurality of consecutively numbered columns, each row entry including one bit in each of the columns, wherein the column number of each bit having a select logic value indicates an operation that is older than an operation associated with the number of the row entry that the bit resides in;
   using pickers in the processor to pick an operation that is ready for execution based on the age of the operation as designated by the ancestry table without using a programmable priority encoder comprised by the pickers; and
   using the programmable priority encoder to pick an operation if the oldest operation is not eligible to be picked.

2. The method of claim 1 further comprising:
   designating an allocation order number for each row entry.

3. The method of claim 1 further comprising:
   receiving a plurality of requests that correspond to respective ones of the row entries; and
   determining a plurality of results that indicate the priority of the row entries, depending on whether the row entries are read from top-to-bottom or bottom-to-top.

4. The method of claim 1 further comprising:
   receiving a plurality of new operations;
   assigning a queue identifier (QID) to each new operation; and
   establishing a QID list that indicates, for each row entry, whether or not the operation associated with the row entry is requesting to be picked.

5. The method of claim 4 wherein the list assigns unused QIDs to newly received operations so that every operation in the scheduler queue has a unique identifier.

6. The method of claim 5 further comprising:
   storing a set of bits in an unassigned row entry of the ancestry table, the bit set indicating the row entries associated with the new operations.

7. The method of claim 1 wherein a post wake unit checks the operations in queue to determine whether they are ready to be picked and executed.

8. A method, implemented by a processor, of implementing programmable priority encoding to track relative age order of operations in a scheduler queue, the method comprising:
   maintaining, in the scheduler queue, an ancestry table including a plurality of consecutively numbered queue identifier (QID) row entries and a plurality of consecutively numbered columns, each QID row entry including one bit in each of the columns, wherein the column number of each bit having a select logic value indicates an operation that is older than an operation associated with the number of the row entry that the bit resides in;
   receiving a plurality of new operations;
   storing a first set of bits in an unassigned QID row entry of the ancestry table, the first bit set indicating the QID row entries associated with the new operations;
   using pickers in the processor to pick an operation that is ready for execution based on the age of the operation as designated by the ancestry table without using a programmable priority encoder comprised by the pickers; and
   using the programmable priority encoder to pick an operation if the oldest operation is not eligible to be picked.

9. The method of claim 8 further comprising:
   storing at least one additional set of bits in at least one other unassigned QID row entry of the ancestry table that indicates the priority of each of the new operations.

10. The method of claim 8 wherein each bit in the first bit set having a select logic value indicates a particular QID row entry associated with a new operation.

11. A processor configured to implement programmable priority encoding to track relative age order of operations in a scheduler queue, the processor comprising:
    a scheduler queue configured to maintain an ancestry table including a plurality of consecutively numbered row entries and a plurality of consecutively numbered columns, each row entry including one bit in each of the columns, wherein the column number of each bit having a select logic value indicates an operation that is older than an operation associated with the number of the row entry that the bit resides in; and
    pickers including a programmable priority encoder, wherein the pickers are configured to pick an operation that is ready for execution based on the age of the operation as designated by the ancestry table without using a programmable priority encoder, and to use the programmable priority encoder to pick an operation if the oldest operation is not eligible to be picked.

12. The processor of claim 11 wherein an allocation order number is designated for each row entry.

13. The processor of claim 11 wherein a plurality of requests are received that correspond to respective ones of the row entries, and a plurality of results are determined that indicate the priority of the row entries, depending on whether the row entries are read from top-to-bottom or bottom-to-top.

14. A processor configured to implement programmable priority encoding to track relative age order of operations in a scheduler queue, the processor comprising:
    a scheduler queue configured to maintain an ancestry table having a plurality of consecutively numbered queue identifier (QID) row entries and a plurality of consecutively numbered columns, each QID row entry including one bit in each of the columns, wherein when a plurality of new operations are received, a first set of bits is stored in an unassigned QID row entry of the ancestry table, the first bit set indicating the QID row entries associated with the new operations; and pickers configured to determine the oldest entries in the ancestry table associated with respective operations, wherein the pickers include a programmable priority encoder that is used to pick an operation if the oldest operation is not eligible to be picked, and is not used to pick an operation if the oldest operation is eligible to be picked.

15. The processor of claim 14 wherein at least one additional set of bits is stored in at least one other unassigned QID row entry of the ancestry table that indicates the priority of each of the new operations.

16. The processor of claim 14 wherein each bit in the first bit set having a select logic value indicates a particular QID row entry associated with a new operation.

17. A non-transitory computer-readable storage medium storing a set of instructions for execution by one or more processors to facilitate manufacture of a processor that includes:

a scheduler queue configured to maintain an ancestry table including a plurality of consecutively numbered row entries and a plurality of consecutively numbered columns, each row entry including one bit in each of the columns, wherein the column number of each bit having a select logic value indicates an operation that is older than an operation associated with the number of the row entry that the bit resides in; and pickers configured to pick an operation that is ready for execution based on the age of the operation as designated by the ancestry table, wherein the column number of each bit having a logic one value indicates an operation that is older than the operation associated with the number of the row entry that the bit resides in, wherein the pickers include a programmable priority encoder that is used to pick an operation if the oldest operation is not eligible to be picked, and is not used to pick an operation if the oldest operation is eligible to be picked.

18. The non-transitory computer-readable storage medium of claim 17 wherein the instructions are Verilog data instructions.

19. The non-transitory computer-readable storage medium of claim 17 wherein the instructions are hardware description language (HDL) instructions.

20. A non-transitory computer-readable storage medium storing a set of instructions for execution by one or more processors to facilitate manufacture of a processor that includes:

a scheduler queue configured to maintain an ancestry table having a plurality of consecutively numbered queue identifier (QID) row entries and a plurality of consecutively numbered columns, each QID row entry including one bit in each of the columns, wherein when a plurality of new operations are received, a first set of bits is stored in an unassigned QID row entry of the ancestry table, the first bit set indicating the QID row entries associated with the new operations; and pickers configured to determine the oldest entries in the ancestry table associated with respective operations, wherein the pickers include a programmable priority encoder that is used to pick an operation if the oldest operation is not eligible to be picked, and is not used to pick an operation if the oldest operation is eligible to be picked.

21. The non-transitory computer-readable storage medium of claim 20 wherein the instructions are Verilog data instructions.

22. The non-transitory computer-readable storage medium of claim 20 wherein the instructions are hardware description language (HDL) instructions.

\* \* \* \* \*